W. HARRIS.
Stereoscopic Cameras.

No. 145,296.  Patented Dec. 9, 1873.

WITNESSES.  
Frank S. Parker  
M. C. Keeler.

INVENTOR.  
Warren Harris  
By William Eason Atty

UNITED STATES PATENT OFFICE.

WARREN HARRIS, OF DANVILLE, VERMONT.

IMPROVEMENT IN STEREOSCOPIC CAMERAS.

Specification forming part of Letters Patent No. 145,296, dated December 9, 1873; application filed August 24, 1872.

*To all whom it may concern:*

Be it known that I, WARREN HARRIS, of Danville, in the county of Caledonia, State of Vermont, have invented a certain new and useful Improvement in Stereoscopic Cameras, of which the following is a specification:

The object of my invention is to take positive stereoscopic pictures on ferrotype or other opaque plates, which shall not require transposition before viewing in the stereoscope, by the employment, in combination with the two object-glasses of a stereoscopic camera, of two reflectors placed at an angle of forty-five degrees with the sensitive plate, one of them being farther from the object, and also from the sensitive plate, by a distance corresponding with the distance between the two eyes, than the other, so that it will reflect the light through the object-glass onto the plate without causing it to cross the rays which form the other image, thereby obviating the necessity for transposition.

Different kinds of object-glasses require different arrangements, in order to bring the reflectors into the position above described.

Figure 1:
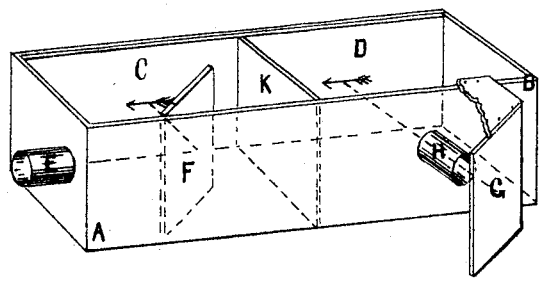
Figure 2:
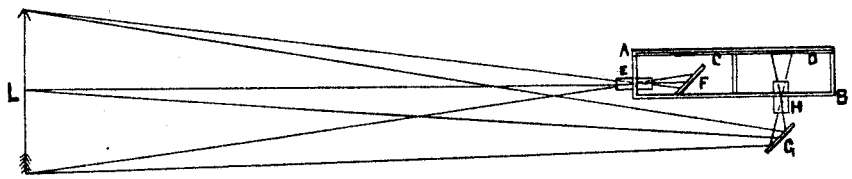

When wide-angle object-glasses are employed, as they most commonly are for out-door pictures, they must be arranged as shown in Figs. 1 and 2.

Figure 1 is a perspective view. Fig. 2 is an illustrative plan of the same.

A represents a stereoscopic-camera box divided into two chambers by the partition K. C D represents the sensitive plate. H is an object-glass in the same position as in ordinary stereoscopic cameras. G is a reflector fixed in a hood at an angle of forty-five degrees with the sensitive plate. The hood may be attached to the camera-box or to the object-glass. E is the other object-glass inserted in the end of the camera-box with its axis pointing in a direction at right angles to that of the other object-glass. F is another reflector placed at an angle of forty-five degrees with the plate, and fixed inside the box immediately behind the object-glass.

The mode of operation is as follows: The camera is placed with the sensitive plate parallel with the principal ray of light from the object toward which the object-glass E is pointed. L is the object, from which the light passes directly through the object-glass E, and is reflected by the reflector F to the sensitive plate, forming the left-hand image. The light which strikes the reflector G is reflected through the object-glass H, and forms the right-hand image. The light which forms both images is reflected in the manner described, for the purpose of obviating the necessity for transposition.

The object-glasses are placed with their axes at right angles with each other for the purpose of enabling the reflectors to be brought close to the object-glasses and be made smaller. The reflectors may be varied slightly from the angle of forty-five degrees, so as to increase or lessen slightly the distance between the centers of the two images. The reflectors should reflect from the nearest surface, or reflecting prisms may be used.

Since the light which forms one image travels five or six inches farther than that which forms the other, one object-glass should be of longer focal length than the other, theoretically; but for ordinary out-door pictures it is practically unnecessary.

I claim as my invention—

The combination of two reflectors, with the two object-glasses of a stereoscopic camera, the two object-glasses being placed at right angles with each other, with one of the reflectors in front of one object-glass outside of the camera, and the other reflector behind the other object-glass inside of the camera, the two reflectors being at an angle of about forty-five degrees with both the sensitive plate and the object-glasses, substantially as described, and for the purpose set forth.

WARREN HARRIS.

Witnesses:
FRANK G. PARKER,
M. C. KEELER.